Dec. 8, 1959 B. G. PRICE 2,915,830
TUBING CALIPER
Filed May 21, 1958 3 Sheets-Sheet 1
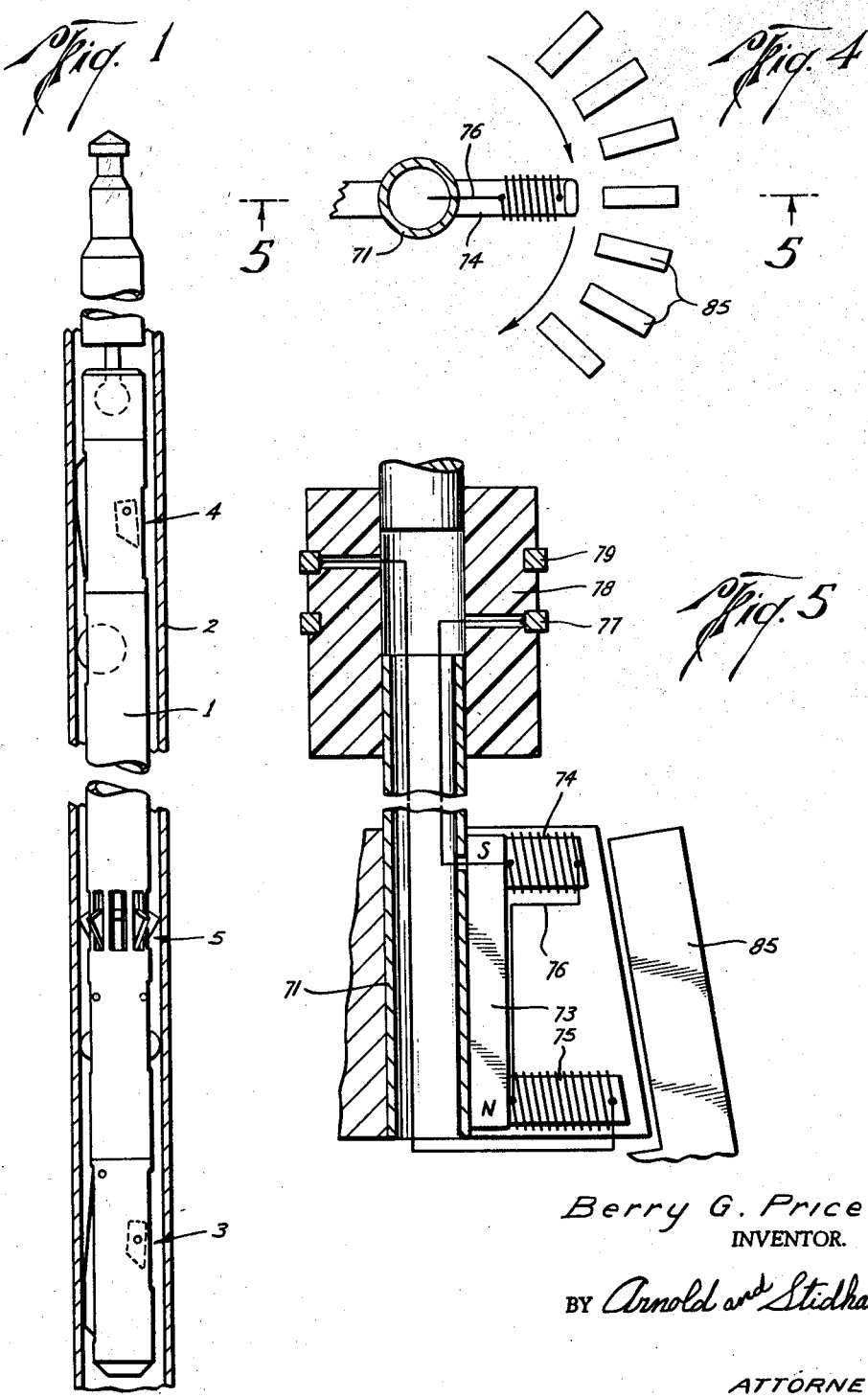
Berry G. Price
INVENTOR.
BY Arnold and Stidham
ATTORNEYS

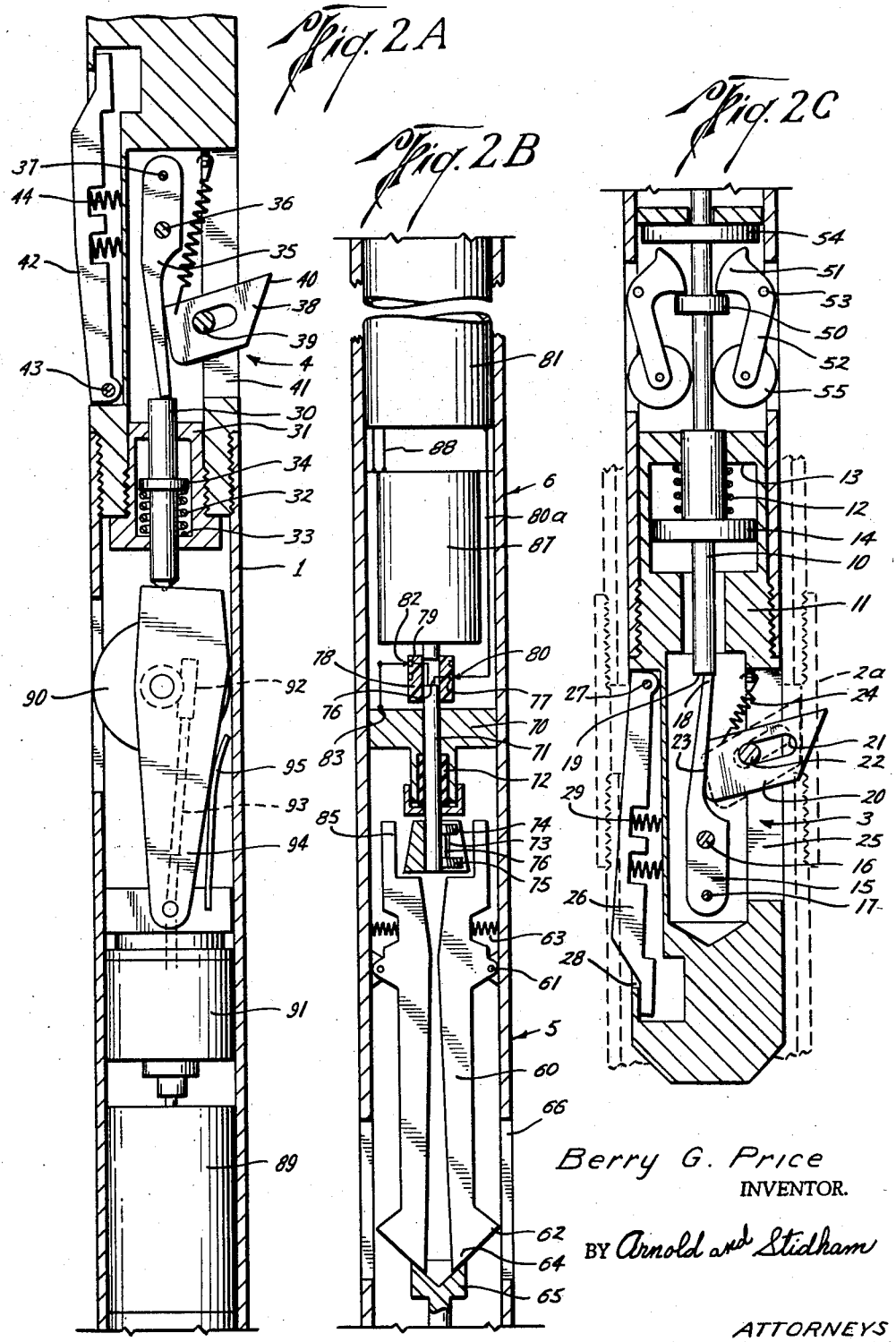

Dec. 8, 1959  B. G. PRICE  2,915,830
TUBING CALIPER
Filed May 21, 1958  3 Sheets-Sheet 3
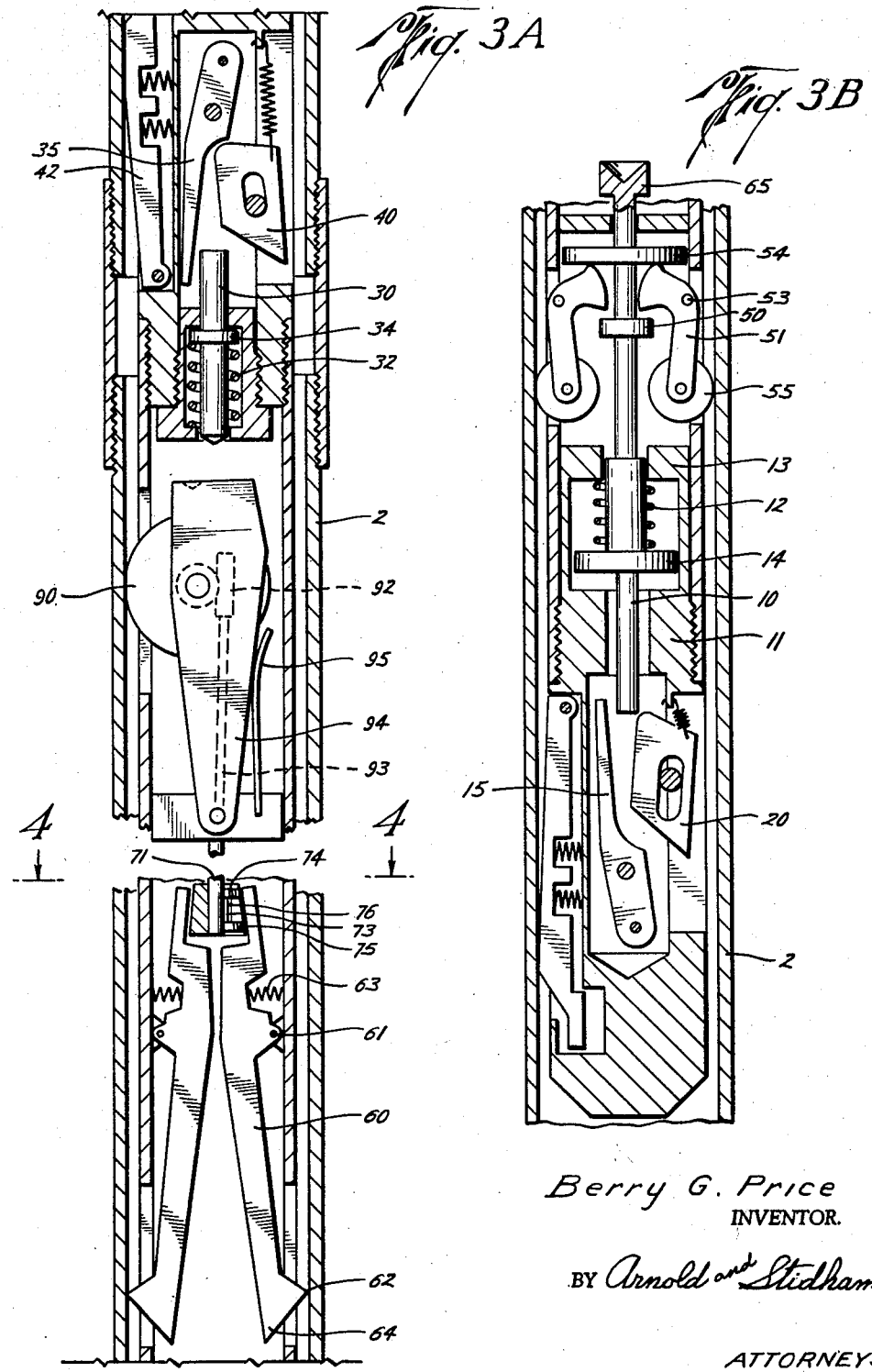
Berry G. Price
INVENTOR.
BY Arnold and Stidham
ATTORNEYS United States Patent Office                                  2,915,830
                                                                   Patented Dec. 8, 1959

1

2,915,830

TUBING CALIPER

Berry Glenn Price, Houston, Tex., assignor to Tuboscope Company, Harris County, Tex., a corporation of Delaware Application May 21, 1958, Serial No. 736,734

11 Claims. (Cl. 33—178)

This invention relates to tubing calipers and, more particularly, to a device for measuring and recording pits, cracks and other variations in internal diameter of tubular members such as those used in oil wells.

Tubing calipers are presently employed in some areas of the oil industry in order to detect the existence of pits, cracks and other effects of corrosion and erosion on the wall of tubular goods in place in a well without requiring the removal of such tubular goods. Generally, however, such devices consist merely of predetermined mechanical linkages which are inherently incapable of distinguishing finely between pits and cracks of a varying depth. Moreover, such devices usually include a plurality of feeler members associated with an indicator device operated only by the feeler or feelers in maximum radial extension, so that only a pit of maximum depth at a given elevation of the feelers will be recorded. Consequently, circumferentially extending pits or cracks of varying depth cannot be identified.

It is, therefore, an object of this invention to provide a tubing caliper capable of detecting and recording pits or irregularities encountered by each and all of a circumferential array of feelers.

It is a further object of this invention to provide means for translating radial movement of each of the feelers into electrical signals of varying intensity dependent upon the radial movement so that the depth of pits encountered by each feeler can be determined accurately.

It is a further object of this invention to provide a tubing caliper having minimum electrical power requirements which is operative to generate and record electrical signals of varying intensity indicative of the location and depth of pits.

In carrying out my invention I provide a plurality of feelers having a pipe contact portion biased outwardly into engagement with the inner wall of a pipe or casing being calipered. Associated with the feelers is a permanent magnet wound with a coil and rotated sequentially past each feeler so that a portion of the feeler constitutes a low reluctance path for flow of magnetic flux to induce an electrical signal as the coil is rotated past each feeler. Movement of each feeler radially outward to engage a pit or crack will vary the size of the air gap in the magnetic flux path from the magnet so that the signal induced in each instance will be dependent upon the radial disposition of the feeler. The signal induced in the coil is transmitted to a recording means operative to record varying intensities of current so that a series of signals will be recorded sequentially indicating the radial extent of each feeler, such series of signals being repeated as the caliper is moved through the pipe.

Other objects and advantages of my invention will become apparent from the description following when read in view of the accompanying drawings wherein:

Fig. 1 is an illustration of my caliper in place in a well;

Figs. 2a, 2b and 2c are longitudinal, cross-sectional views of my caliper in inactive condition;

Figs. 3a and 3b are longitudinal, cross-sectional views of my caliper in active condition;

Fig. 4 is a section view taken along line 4—4 of Fig. 3; and

Fig. 5 is a section view taken along line 5—5 of Fig. 4.

Referring now to the drawings, and particularly to Figs. 1 and 2, my recording caliper is preferably housed within a cylindrical housing 1 of sufficiently small diameter to permit free passage thereof through a tubing, casing pipe or the like 2 being calipered. My tubing caliper includes several cooperating assemblies including trip mechanisms 3 and 4, a feeler assembly 5 and a recording mechanism 6.

Referring first to the lower trip mechanism 3 in Fig. 2c, I provide a plunger 10 mounted for axial movement in reduced diameter portions 11 of the housing 1 and urged downward by coil spring 12 acting against an internal shoulder 13 in the housing 1 and a radial flange 14 on the plunger 10. A trip lever 15 is pivoted on the housing at 16 but is normally secured against pivotal movement by means of a shear pin 17 or the like in a fixed position wherein the free upper end 18 thereof engages the lower end 19 of the plunger 10 to retain the plunger in an elevated position in opposition to the spring 12. Engaging the shank portion of the trip lever 15 is a cam member 20 having a slot 21 therein carried on a pin 22 secured to the housing. A cam surface 23 thereon is adapted to engage the shank of the trip lever 15 and such engagement is maintained by means of a coil spring 24. The cam member 20 is normally extended through an opening 25 in the housing 1 to engage the inner wall of the tubing 2 being calipered. Engagement of cam member 20 is insured by a pressure member or centralizer 26 pivoted to the housing 1 at 27 to extend through an opening 28 at the opposite side of the housing. The centralizer 26 is biased outwardly by coil springs 29 to force the entire housing 1 and, hence, the cam member 20 in a direction diametrically opposite therefrom.

It can be seen that as the housing 1 is lowered in a well, the cam member 20 is free to pivot in a counter-clockwise direction as shown in dashed lines in Fig. 2c upon engagement thereof with an obstacle such as a collar 2a within the tubing, but is returned by action of spring 24 to the position shown. Since this spring is of insufficient strength to overcome the shear pin 17, the trip lever 15 will be retained in its cocked position shown in Fig. 2c while the tool is being lowered into the well. However, when the desired depth to begin calipering operations is reached, the housing 1 is raised within the well until the cam member 20 engages a collar 2a on the casing. Thereafter, further upward movement of the housing will force the cam member 20 in a clockwise direction in Fig. 2c until the shear pin is fractured and trip lever 15 is forced by cam surface 23 out of the path of the plunger 10. The downward movement of the plunger 10 releases calipering mechanism as will be hereinafter described.

Similar to the trip mechanism 2 is the upper trip mechanism 4 shown in Fig. 2a and including a plunger 30 axially slidable in a reduced diameter portion 31 and biased by a spring 32 acting against internal shoulder 33 and radial flange 34. Opposing the plunger spring 32 is a trip lever 35 pivoted at 36 but normally secured in place by shear pin 37. A cam lever 38 is pivoted at 39 so that a pipe engaging portion 40 protruding through a window 41 of the housing will, upon engagement of a pipe collar 2a therewith, cam the trip lever 35 out of the path of the plunger 30 to permit elevation of the plunger under force of the coil spring 32. Again, a centralizer 42 is pivoted at 43 and biased outwardly by springs 44 to insure engagement of the cam trip mechanism 38.

When the lower trip mechanism 3 is actuated and the plunger 10 is thrust downward, a radial flange 50 thereon, normally engaging the lower part of arm 51 of each of a series of bell crank levers 52 pivoted at 53, is moved clear thereof. Subsequently, a second radial flange 54 on the plunger 10 is brought into engagement with the upper side of the arms 51 to pivot the bell crank levers 52 outwardly to bring centralizing rollers 55 into engagement with the tubing 2. Of course, the coil spring 12 which forces the centralizing rollers outwardly functions also as a yieldable means to permit retraction of the rollers when obstructions such as a collar 2a are encountered.

Pivotally mounted on the housing 1 is a circumferential array of longitudinally disposed feelers 60, each independently pivoted at 61 on the housing and having a sharp detecting point 62 thereon adapted to enter fine cracks, crevices or pits. Preferably, a coil spring 63 engages each feeler to bias it independently in a radially outward direction into engagement with the pipe or casing 2. The lower extremity 64 of each feeler is received within a cup-like receptacle 65 carried on the upper end of plunger 10 while the plunger is in its elevated position shown in Fig. 2. However, when the plunger is driven downwardly as hereinbefore described the cup 65 is carried away from the feeler extremities 64 to the position shown in Fig. 3 and each feeler is forced independently by its coil spring 63 until the detecting point 62 protrudes through a window 66 in the housing 1 and engages the inner wall of the pipe 2.

Journaled within a bearing member 70 carried within the housing 1 is a hollow shaft 71. Preferably packing glands 72 are provided to prevent well fluid which may enter the housing through openings 66 from flowing past the bearing flange 70. Carried on the hollow shaft 71 at the lower end thereof adjacent to the feelers 60 is a bar magnet 73 of Alnico or the like having pole extension pieces 74 and 75, around which is coiled a conductor 76. One end of the conductor is led through the hollow shaft to terminate at a slip-ring 77 carried on a shaft coupling 78 and the other end of the coil is carried through the shaft to a second slip-ring 79 on the coupling 78. A brush 80 engages the slip-ring 77 to direct current through conductor 80a to any conventional recorder mechanism shown generally at 81 adapted to record the intensity of current. The second slip-ring 79 is engaged by a brush 82 connected to ground 83 at the housing 1.

Carried on each feeler is an extension 85 of a magnetically permeable material which, when the feeler point 62 is in engagement with the inner wall of the pipe, lies substantially parallel to the ends of the pole pieces 74 and 75 (Figs. 4 and 5) to form a low reluctance path for flow of magnetic flux between the poles. As the magnet rotates toward and past each low reluctance section of a feeler 85, a voltage of gradually increasing intensity and then gradually decreasing intensity is induced. However, if a feeler tip 61 moves outward into a pit or crack, the low reluctance flux path extension 85 will move closer to pole pieces 74 and 75 reducing the air gap presented to the magnetic flux path thereby increasing the flux density within the magnet and coil. Consequently, the maximum voltage induced in the coil 76 as the magnet rotates past a given feeler extension 85 will vary according to the radial displacement of the feeler extension from the pole pieces 74 and 75. Since the maximum intensity of the induced signal is indicative of the radial disposition of the extension 85 of each feeler as the magnet is rotated past such feeler, the intensities of the recorded signals will indicate pits encountered by the feeler end 62 and the depth thereof.

If desired, of course, the feeler arms 60 could be in the form of bell crank levers with the low reluctance extension being disposed radially so that movement thereof follows generally an axial path. In such case the horseshoe-type magnet would be arranged with both pole extensions disposed axially and rotated about the longitudinal axis.

Preferably, the hollow shaft 71 is driven at constant speed by an electric motor 87 powered by batteries (not shown) in the upper part of the housing 1 through conductors 88. The motor is connected to shaft 71 by means of the coupling 78.

Preferably, the recording mechanism 81 is driven by a clock mechanism shown generally at 89. The clock mechanism is maintained in driving condition by means of a drive wheel 90 frictionally engaging the tubing wall 2. The drive wheel 90 is operative to drive the clock mechanism through a gear box 91 by any desirable means such as a worm and gear arrangement 92 on a shaft 93 connected by a flexible coupling to the gear box.

The drive wheel is carried on an arm 94, biased outwardly by any desirable means such as spring 95, but is normally held centrally located by engagement of the plunger 30 in a suitable detent or receptacle on the arm 94. Upon upward movement of the plunger 30 in response to release of the upper trip mechanism 4 as hereinbefore described, the drive wheel 90 is driven outwardly to commence driving the recording means.

In operation, my tubing caliper is lowered into the well casing 2 in the retracted condition shown in Fig. 2. When the desired depth for commencement of calipering operations is reached, the housing 1 is raised until cam members 20 and 40 engage collars 2a on the casing. Further movement of the housing 1 will cause the cam members to force trip levers 15 and 35 out of the paths of plungers 10 and 30, respectively, to release the feelers 60, the drive wheel 90 and the centralizing rollers 55. Release of the feelers 60 moves low reluctance extensions 85 thereon to a position adjacent the circular paths followed by the ends of pole pieces 74 and 75 rotating with shaft 71. Since the low reluctance extensions provide a flux path between the pole pieces, a current is induced in the coil 76 each time the pole pieces pass a feeler extension 85, the intensity of the current being dependent upon the radial displacement of the low reluctance extension from the ends of the pole pieces. Since this displacement is, of course, governed by movement of the feelers 60 in respose to engagement thereof with irregularities in the casing wall 2, the recordation of signals representative of current intensity will indicate the existence and depth of a pit encountered by a feeler 60.

The magnet 73 being rotated moves into association sequentially with the extension 85 of each of the circumferential series of feelers 60. Consequently, the recording mechanism 81 will record a repeating series of signals, each signal reflecting the radial displacement of one of the feelers 60 and each series of signals representing a full circumferential analysis of the casing wall.

It is obvious that many changes and modifications can be made in my structure without departing from the spirit and scope of my invention and I, therefore, intend to be limited only to the invention defined by the annexed claims.

Having described my invention, I claim:

1. In a tubing caliper comprising an elongate body adapted to be moved axially within a tubular member and a circumferential array of longitudinally disposed feelers pivotally mounted on said body for radial movement, a portion of each of said feelers being adapted to engage the inner wall of said tubular member to effect radial movement of said feeler in response to longitudinal movement of said portion thereof over irregularities in said inner wall, the combination therewith of apparatus for recording radial movements of said feelers comprising, an electrical conductor, means for recording variations in the intensity of current in said conductor, and means for inducing a current in said conductor including a plurality of first magnetic elements, each of such first magnetic elements being movable in a given path on said body, and a second magnetic element rotatable on such body to move transversely past said given paths and adjacent to each of said first magnetic elements in succession, said second magnetic element forming with each of said first magnetic elements when adjacent thereto a low reluctance circuit for flow of magnetic flux interrupted by air gaps between adjacent surfaces of said first and second magnetic elements, each of said first magnetic elements being connected to one of said feelers so that movement thereof along said given path is effected by radial movement of said feeler.

2. In a tubing caliper comprising an elongate body adapted to be moved axially within a tubular member and a circumferential array of longitudinally disposed feelers pivotally mounted on said body for radial movement, a portion of each of said feelers being adapted to engage the inner wall of said tubular member to effect radial movement of said feeler in response to longitudinal movement of said portion thereof over irregularities in said inner wall, the combination therewith of means for recording radial movements of said feelers comprising, an electrical conductor, means for recording variations in the intensity of current in said conductor, and means for inducing a current in said conductor including a pluarilty of first magnetic elements, each of said first elements being carried on one of said feelers to move therewith in a radial plane, and a second magnetic element rotatable on said body to move transversely through said radial planes adjacent to each of said first elements in succession, said second element forming with each of said first elements when adjacent thereto a low reluctance circuit for flow of magnetic flux interrupted by air gaps between adjacent surfaces of said first and second elements, the extent of said air gaps varying with movement of said first element effected by radial movement of one of said feelers.

3. In a tubing caliper comprising an elongate body adapted to be moved axially within a tubular member and a circumferential array of longitudinally disposed feelers pivotally mounted on said body for radial movement, a portion of each of said feelers being adapted to engage the inner wall of said tubular member to effect radial movement of said feelers in response to longitudinal movement of said portion thereof over irregularities in said inner wall, the combination therewith of apparatus for recording radial movements of said feelers comprising, an electrical conductor, means for recording variations in the intensity of current in said conductor, and means for inducing a current in said conductor including a plurality of magnetic bars, each of said bars being carried on one of said feelers to move transversely therewith in a radial plane, and a permanent magnet rotatable on said body so that the poles thereof move simultaneously through said radial planes adjacent to each of said bars in succession, each of said bars forming a low reluctance path for external flow of flux between the poles of said magnet, said low reluctance path being interrupted by air gaps between said bar and said poles, the extent of said air gaps varying with movement of said bar effected by radial movement of one of said feelers.

4. The apparatus defined in claim 3 wherein each of said bars forms an axial extension of one of said feelers to move transversely in a radial direction and said magnet rotates intermediate said plurality of bars.

5. In a tubing caliper comprising an elongate body adapted to be moved axially within a tubular member and a circumferential array of longitudinally disposed feelers pivotally mounted on said body for radial movement, a portion of each of said feelers being adapted to engage the inner wall of said tubular member to effect radial movement of said feelers in response to longitudinal movement of said portion over irregularities in said inner wall, the combination therewith of apparatus for recording radial movements of said feelers comprising, an electrical conductor, means for recording variations in the intensity of current in said conductor, and means for inducing a current in said conductor including a plurality of magnetic bars, each of said bars being carried on one of said feelers as a longitudinal extension thereof, and a permanent horseshoe type magnet rotatable on said body to move both poles thereof simultaneously in radial alignment with and adjacent to each of said bars in succession, each of said bars when said poles are in radial alignment therewith forming a low reluctance bridge for external flow of flux between said poles, said low reluctance path being interrupted by air gaps between said bar and said poles, the extent of said air gaps varying with radial movement of said bar with one of said feelers.

6. In a tubing caliper comprising an elongate body adapted to be moved axially within a tubular member and a longitudinally disposed feeler pivotally mounted on said body for radial movement, a portion of said feeler being adapted to engage the inner wall of said tubular member to effect radial movement of said feeler in response to longitudinal movement of said portion thereof over irregularities in said inner wall, the combination therewith of apparatus for recording radial movements of said feeler comprising a magnetic bar carried on said feeler to move transversely therewith in a radial plane, a permanent magnet rotatable on said body so that the poles thereof move repeatedly through said radial plane to pass adjacent to said bar, said bar forming a low reluctance path for external flow of magnetic flux between the poles of said magnet, said path being interrupted by air gaps between said bar and said poles, the extent of said air gaps varying with movement of said bar effected by radial movement of said feeler, an electrical conductor coiled about one of said bar and magnet, and means connected to said conductor for recording variations in the intensity of current therein.

7. In a tubing caliper comprising an elongate body adapted to be moved axially within a tubular member and a circumferential array of longitudinally disposed feelers pivotally mounted for radial movement on said body, a portion of each of said feelers being adapted to engage the inner wall of said tubular member to effect radial movement of said feelers in response to longitudinal movement of said portion thereof over irregularities in said inner wall, the combination therewith of apparatus for recording radial movements of said feelers comprising, a plurality of magnetic bars, each of said bars being carried on one of said feelers to move transversely therewith in a radial plane, a permanent magnet rotatable on said body so that the poles thereof move simultaneously through said radial planes adjacent to each of said bars in succession, each of said bars forming a low reluctance path for external flow of flux between the poles of said magnet, said path being interrupted by air gaps between said bars and said poles, the extent of said air gaps varying with movement of said bar effected by radial movement of one of said feelers, an electrical conductor coiled about said magnet, and means connected to said conductor for recording variations in the intensity of current therein.

8. The apparatus defined in claim 7 wherein each of said bars forms a longitudinal extension of one of said feelers to move transversely in a radial direction and said magnet rotates intermediate said plurality of bars.

9. In a tubing caliper comprising an elongate body adapted to be moved axially within a tubular member and a plurality of longitudinally disposed feelers pivotally mounted on said body for radial movement, said plurality of feelers being angularly spaced about the axis of said body, a portion of each of said feelers being adapted to engage the inner wall of said tubular member to effect radial movement of said feelers in response to longitudinal movement of said portion thereof over irregularities in said inner wall, the combination therewith of apparatus for recording the radial movements of said feelers comprising a plurality of magnetic bars, each of said bars forming a longitudinal extension of one of said feelers to move radially therewith, a permanent horseshoe type magnet mounted for rotation about the axis of said body, said magnet being arranged with both poles thereof disposed radially and in the same radial plane, means for rotating said magnet to move said poles simultaneously into and through radial alignment with each of said magnetic bars in succession, each of said bars forming a low reluctance path for external flow of flux between the poles of said magnet, said path being interrupted by air gaps between said bar and said poles, the extent of said air gaps varying with radial movement of said bar, an electrical conductor coiled about said magnet, and means connected to said conductor for recording variations in the intensity of current therein.

10. Apparatus for recording reciprocatory movements of a member comprising an electrical conductor, means for recording variations in the intensity of current in said conductor, and means for inducing a current in said conductor including a magnetic bar carried on said member to reciprocate transversely therewith, and a permanent magnet rotatably mounted so that the poles thereof move simultaneously past said bar in a direction transverse of the reciprocation thereof, said bar forming a low reluctance path for external flow of flux between the poles of said magnet, said path being interrupted by air gaps between said bar and said poles, the extent of said air gaps varying with reciprocatory movement of said bar.

11. Apparatus for recording reciprocatory movements of a member comprising an electrical conductor, means for recording variations in the intensity of current in said conductor, and means for inducing a current in said conductor including a magnetic bar carried on said member to move transversely therewith, a permanent horseshoe type magnet mounted for rotation so that both poles thereof move simultaneously past said bar in a direction transverse to the reciprocatory movements of said member, said bar forming a low reluctance bridge for external flow of flux between said poles, said bar being spaced from said poles a distance varying with reciprocatory movement thereof.

References Cited in the file of this patent
UNITED STATES PATENTS

| | | |
|---|---|---|
| 2,527,170 | Williams | Oct. 24, 1950 |
| 2,721,110 | Price | Oct. 18, 1955 |
| 2,736,967 | Doll | Mar. 6, 1956 |